July 2, 1963
R. E. STOKELY
3,095,715
UNIVERSAL JOINT
Filed May 22, 1961
2 Sheets-Sheet 1
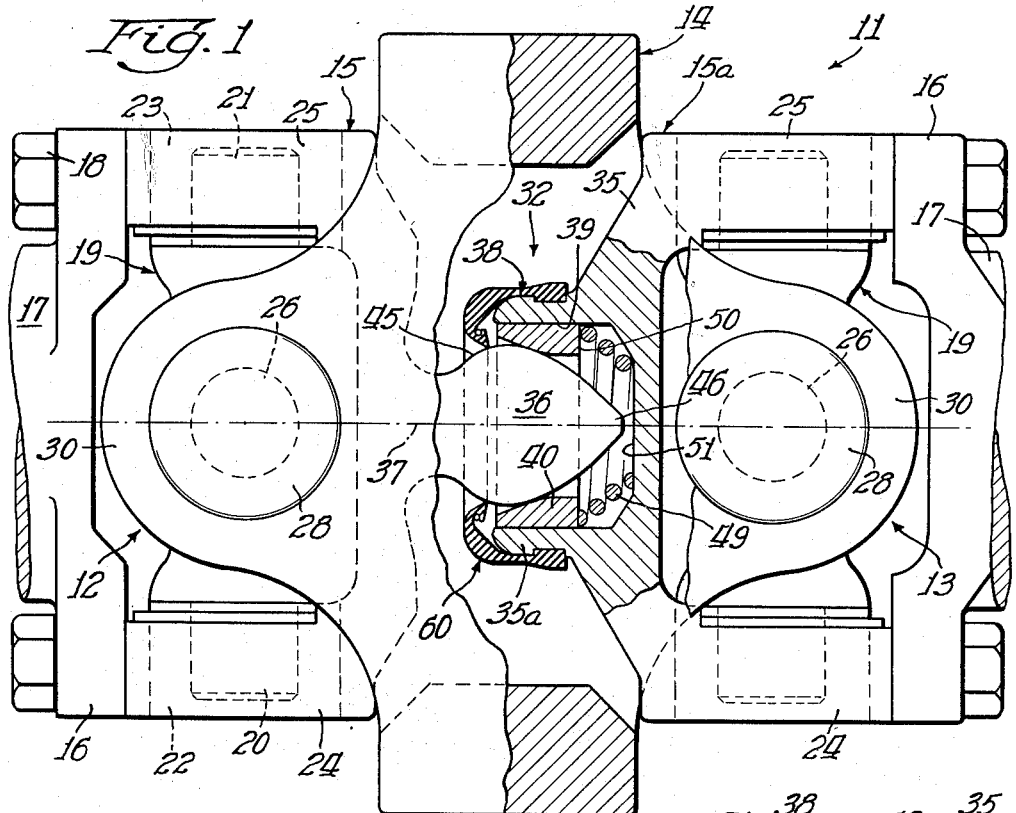
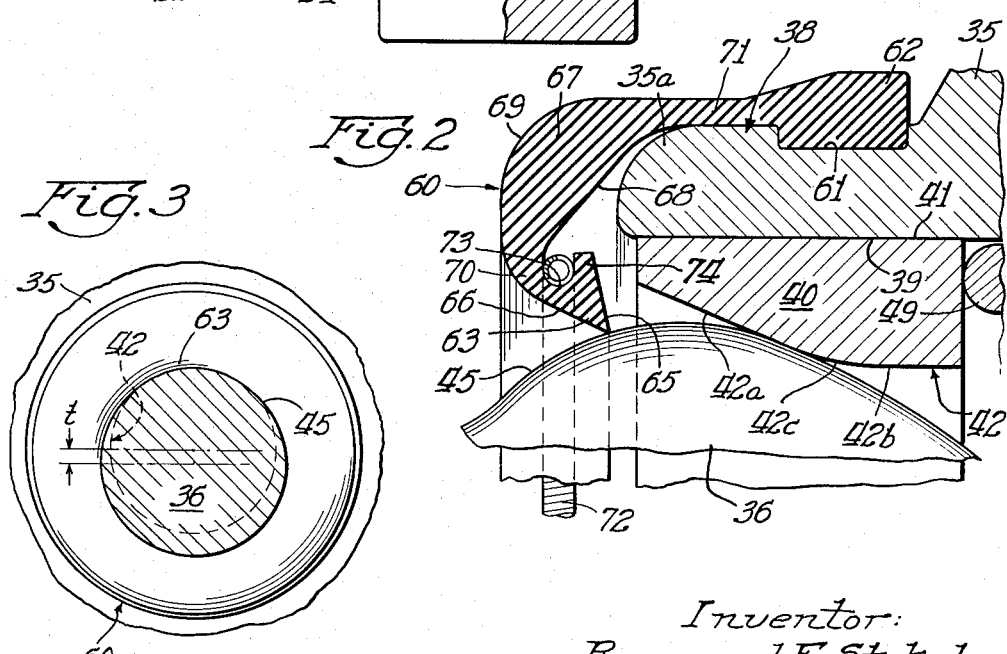
Inventor:
Raymond E. Stokely
By: Joseph W. Malleck Atty.

July 2, 1963
R. E. STOKELY
3,095,715
UNIVERSAL JOINT
Filed May 22, 1961
2 Sheets-Sheet 2
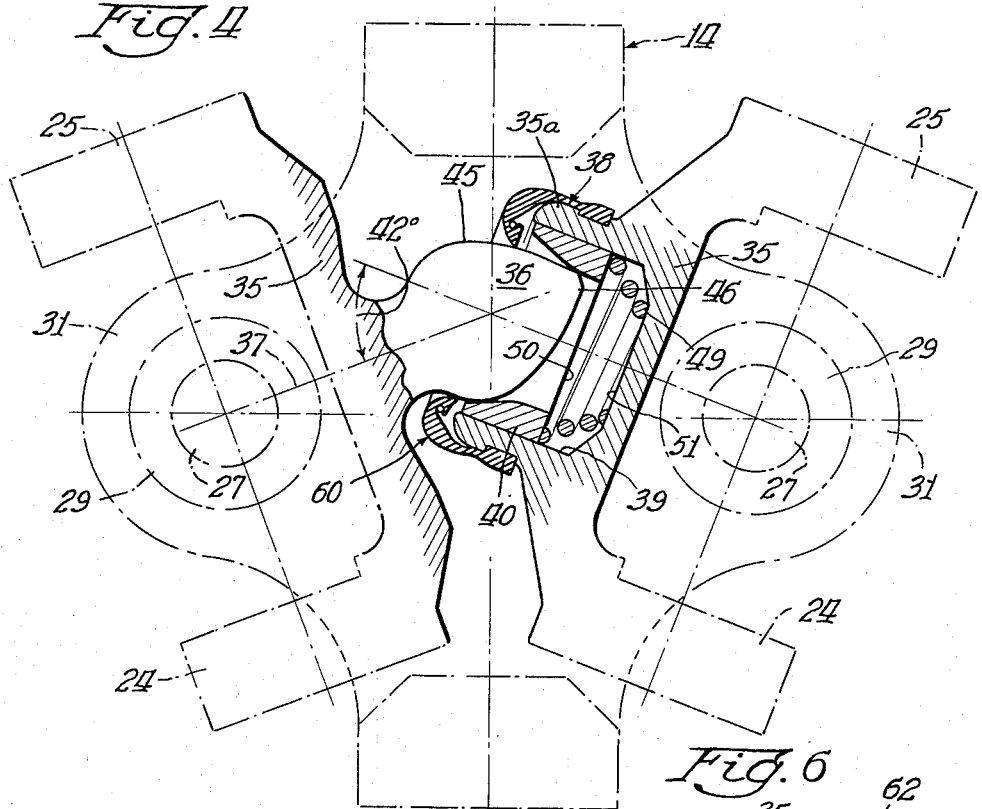
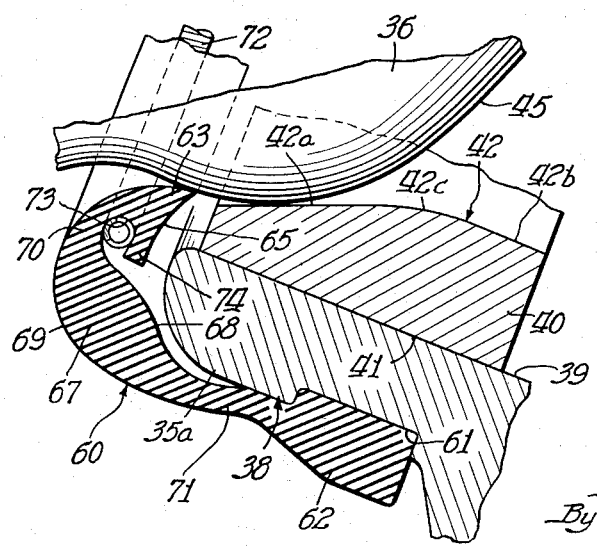
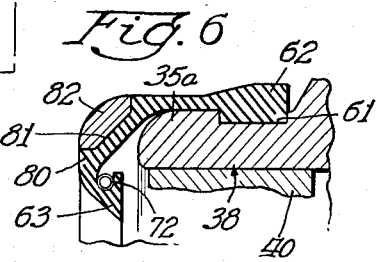
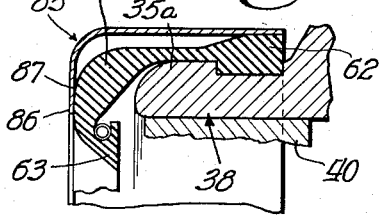
Inventor:
Raymond E. Stokely
By: Joseph W. Malleck Atty.

# United States Patent Office 3,095,715
Patented July 2, 1963

3,095,715
UNIVERSAL JOINT
Raymond E. Stokely, Rockford, Ill., assignor to Borg-Warner Corporation, Chicago, Ill., a corporation of Illinois
Filed May 22, 1961, Ser. No. 111,632
13 Claims. (Cl. 64—21)

This invention relates to universal joints and more particularly to double-Cardan universal joint devices capable of transmitting constant velocity at high joint angles and to a lubricant sealing ring co-operating with such devices to provide in part for efficient operation at such high angles, the sealing ring having a generally elastic pliable sealing portion adapted to seal between annular surfaces of movable members of the device wherein the sealing portion is subjected to an irregular change in shape by action of said members.

Universal joints of the double-Cardan type, such as disclosed in the patent to King, No. 2,947,158, August 2, 1960, and of the C-type as disclosed in the patent to Dodge, No. 2,255,762, September 16, 1941, have found great utility in applications such as automobile drive lines due to their ability to transmit constant angular velocity and yet provide facility for bending of the drive line to avoid any hump in the auto floor board. Joints of these types are particularly economical to manufacture; they utilize a centering device which insures that angular displacement of one shaft connected to the joint will be accompanied by an equal angular displacement of the other shaft connected thereto.

A serious problem which has plagued the use of the above types of universal joints for quite some years has concerned the great cylic rubbing action that takes place between members of the centering device of conventional constructions. Such rubbing is due to the slight axial movement that must accommodate shifting of one member relative to the other member for each revolution of the drive shaft while the joint is angularly disposed.

A major innovation in obviating the wear characteristics of such conventional construction, is disclosed in my patent, No. 2,986,022, entitled "Constant Velocity Joint" issued May 30, 1961. Such disclosure provides for a specific contouring of the male and female members of the centering device which virtually obviates any relative axial movement therebetween. However, in spite of the success of such construction, it lacks certain structural features, as disclosed herein, which enable such joints to assume extremely high joint angles, i.e. of the order of up to 42 degrees, which has heretofore been considered unattainable by the industry. Such high angles are achieved by the features of this invention which not only maintain extremely low wear characteristics but assure transmission of constant angular velocity.

It is, therefore, a primary object of this invention to provide an improved universal joint and particularly a double-Cardan universal joint of the constant velocity type which is capable of assuming high joint angles while transmitting constant angular velocity. In accordance with this object, the instant construction is adapted to utilize a centering device having mating male and female members wherein the male member has an outer surface generated by revolution of a compound curve; a feature is the provision of a male element which is specifically shaped to provide for extremely high angles and has generally a heart-shaped cross-section.

In providing a male element of such shape which is adapted to turn within a socket portion, the annular contour of the male element changes in an irregular manner with respect to a reference plane across the socket portion and thereby presents serious sealing problems for devices which must seal between the male and female members. Pursuant to obviating this sealing problem, this invention further contemplates the provision of a novel sealing ring which co-operates with the high angle centering device for assuming operation of the joint under unprecedented joint angles.

The co-operation of this novel sealing ring with the novel universal joint, can best be appreciated by considering the phenomenon of shaft "run out" which is encountered in many oil seal applications. This phenomenon may be more particularly described as misalignment which occurs between annular shaft sealing surfaces and the axis of shaft rotation. This may be due to shifting of the axis of rotation resulting from bearing looseness or shaft whip. "Run out" should be kept at a minimum but many times this has been found impracticable, if not impossible of accomplishment in prior construction considering the required accuracy of modern seals. Prior oil sealing rings of a unitary construction are ineffective to prevent excess run out in special constructions such as the instant universal joint.

The irregular shape of the instant male element, in essence, provides the same effect as excessive run out when the joint operates at angular position. In each case where the effect of heavy run out is produced, the inner periphery of the lubricant seal ring is subjected to a high degree of irregular deformation. Known sealing rings cannot adapt to such deformation and therefore permit leakage.

It is another object of this invention to provide an improved lubricant sealing ring which functions to compensate for excessive run out.

A more particular object of this invention is to provide an improved lubricant seal means of the lip-sealing type which is constructed of resilient material and which is adapted to maintain a superior seal between surfaces of a device having a spacing which changes in an irregular manner during operation of the device.

Another particular object of this invention is to provide an improved lubricant seal means which has primary and secondary flexing segments, the primary flexing segment being used to maintain a sealing portion in engagement with one of the members to be sealed and the secondary flexing segment functioning to accommodate irregular spacing between the members to be sealed.

Other and more particular objects, uses and advantages of this invention will become apparent upon a reading of the following specification taken in connection with the accompanying drawings which form a part thereof, wherein:

FIG. 1 is an elevational view, partly broken away, of a double-Cardan universal joint and embodying the principals of this invention;

FIG. 2 is an enlarged fragmentary central sectional view of the centering device of the universal joint and shown in a minimum angular position;

FIG. 3 is an enlarged plan view of the sealing ring shown in one of its extreme distended conditions during sealing of the centering device;

FIG. 4 is a central sectional view of a double-Cardan universal joint and shown in position in which it is displaced to its maximum angularity;

FIG. 5 is an enlarged fragmentary sectional view of the sealing ring and centering device shown in a position of maximum angularity;

FIG. 6 is a central sectional view of an alternative embodiment of the sealing ring; and FIG. 7 is a view like that in FIG. 6 illustrating still another embodiment of the sealing ring.

Referring now to the drawings and more particularly to FIG. 1, there is disclosed a preferred embodiment of this invention comprising a double-Cardan universal joint device 11 having first and second joints or joint sections 12 and 13 respectively coupled by ring member 14. Each joint section includes a yoke 15 attached to a flange portion 16 adapted to be formed on or attached to a torque transmitting shaft 17 by cap screw means 18, one shaft being selected as a driving member and the other a driven member. Each yoke is adapted to receive a cross 19 with opposite extending trunnions 20 and 21 of the cross disposed respectively in suitable seats 22 and 23 in arms 24 and 25 of each yoke. The other oppositely extending trunnions 26 and 27 of the cross are journaled in suitable bearings 28 and 29 carried by integral arms 30 and 31 extending axially outwardly from diametrically opposite sides of the coupling ring member 14.

To provide for constant transmission of angular velocity, a centering device or means 32 is provided which guides the angularly disposition of each of the yokes. Such centering means comprises a bridge 35 on each yoke which connects the arms 24 and 25. One yoke has formed on its bridge 35 a male element 36 shaped as a body of revolution having its axis 37 generally in axial alignment with the axis of shaft 17; the male element extends outwardly and toward the other yoke. The other yoke has formed on its bridge a female socket portion 38 adapted to envelope the male element; the female socket portion comprises generally a cylindrical cavity 39 formed in a neck 35a of the bridge and a socket insert 40. The cavity is open at one end only and faces the male element. The insert 40 has an annular body with an outer cylindrical surface 41 adapted to slidably fit with the surface 39 of the cavity. The insert has an inner surface 42 which is formed by revolution of a line which is bent in character. The resulting surface 42 has a generally conical section 42a and a cylindrical section 42b joined by a rounded shoulder 42c.

The male element has an outer surface 45 which is generated by revolution of a line comprising a compound curve about axis 37. The line is adapted to form an outer surface 45 which is substantially heart shaped in cross-section and provides for a generally pointed nose portion 46.

The surfaces 45 and 42 are contoured with respect one to the other so that the male element will maintain tangency with the female socket insert at least at two opposite radial points during all angular positions of the double-Cardan joint. The general approach as to the selection of proper contouring may be in accordance with the mathematical steps as outlined in my Patent No. 2,986,022, issued May 30, 1961. It is important to point out in this particular invention that the surfaces 45 and 42 are each formed of curved surfaces and both are preferably compound curves. Also, of particular significance, is the extreme extension of the curve forming the male element which results in a generally pointed nose portion.

The insert 40 is held in place axially of the cavity 39 by a conical coil spring 49, one side of which abuts the side 50 of the insert and the other side of the spring seats in the bottom 51 of the cavity 39. Although the insert during operations is theoretically static, its effect may best be explained by stating that the male element 36 exerts a force against the insert 40 which is balanced by forces exerted by the spring 49 through the insert and against the male element. The spring, therefore, forces the male element and female socket insert to maintain contact at all times and at least at two opposite radial points.

It is important to maintain lubricant within the cavity 39 so as to lubricate the engaging surfaces between the male element and the female socket portion. This necessitates sealing across the male element 36 and the open terminal of the female socket portion 38. In providing a universal joint with male and female structures shaped in the above irregular manner, sealing between the generally concentric surfaces of such elements cannot be accomplished by the use of known annular sealing devices. Present day sealing rings cannot accommodate shaft "run out" such as is encountered when the male element is angularly shifted within the female element.

To obviate this problem, this invention contemplates the provision of a unique and improved sealing ring or sleeve 60, as shown in FIGS. 2–5, which comprises a unitary body formed of moldable elastic and pliable material such as natural or synthetic rubber and which is preferably oil-resistant as neoprene and Purvenan type compounds. In the condition of the sealing ring with yoke 15 and 15a of the device in axial alignment, the unitary body has a generally L shape in cross section. The relatively long sleeve portion of the L extends generally in an axial direction. At the outer terminal of the longer portion of the sleeve in cross-section is found an annular stiffening portion 62 having a substantially rectangular cross-section. Stiffening portion 62 is supported on neck 35a and is seated in an annular groove 61 formed on the exterior of the neck. At the foot end of the L and located radially and axially inwardly of the stiffening portion is an inturned terminal specially constructed to define wiping portion 63 having an annular flexible and relatively sharp lip defined by a generally flat annular surface 65 extending generally normally to the axis of the ring and a conical surface 66. Intermediate the stiffening portion 62 and the wiping portion 63 is a web 67 of thickness equal to or greater than the stiffening and wiping portions. The web 67 has an inner surface 68 which is substantially flat and is disposed on a bias relative to the radius of the sealing ring. The outer surface 69 of the web is generally curved.

The wiping element, mounting section, and web are interconnected by relatively thin neck portions 70 and 71, the latter flanking the relatively thick web 67. The cross-sectional shape of neck portion 71 is substantially longer than neck portion 70 and has its greatest dimension extending generally axially of the sleeve whereas the neck portion 70 extends generally radially.

The differential nature of each of the neck portions is of primary significance to the capacity of the sealing ring to accommodate movement of the male and female structures for high joint angles. Neck portion 70 may be characterized as being a primary flexing segment which retains the wiping element resiliently in contact with the outer surface of the male element and to accommodate the annular sealing portion to irregular changes in circumferential shape of the male element assumed with respect to a plane across the female socket. Neck portion 71 may be characterized as a secondary flexing segment which permits the entire sealing ring, including the wiping element and thickened web 67 to accommodate "run out" or non-concentricity between the surfaces of the male element and female socket portion at high joint angles brought about by the progressively changing contours of such surfaces which promote the phenomenon of "run out"; the secondary segment also supplements or aids the primary segment in accommodating irregular changes in circumferential shape of the surface of the male element 36 with which it makes fluid sealing contact. Such secondary flexing segment permits the inner circumference of the sealing ring or sleeve to move between two extreme positions, a first position occurring when the joint device is at its minimum angle causing the wiping element to assume a circular shape, and a second position occurring at the maximum angle of the joint device causing the wiping lip portion to form an enlarged generally pear-shaped opening which is shifted out of concentricity a distance "t," as shown in FIG. 3. In the first position (FIG. 2) and considering its cross-sectional aspect, it is disposed generally normally to surface 45 of the male member and the mounting section is generally axially disposed; the thickened web 67 biases between the wiping lip 63 and the mounting section at a substantially 45 degree angle. In the second position (FIG. 5), the web 67 has been distorted into a generally aligned position with the mounting section and the wiping element has been inwardly turned under acutely until it is almost folded into contact with surface 68.

In addition to the resilient properties of the wiping element and the action of the reduced neck portion 70 to maintain the wiping element lip in contact with the male element, it is also so urged in a generally radially inward direction by an embracing garter spring 72 which is mounted in a seat 73 formed between a flange 74 extending radially outwardly from the wiping lip 63 and the neck portion 70.

In FIG. 6 is illustrated another embodiment of the sealing ring, wherein a web 80 is provided with an annular cut-out portion 81 to which is bonded an annular stiffening member 82. The web, in essence, is impregnated with rigid material in an annular shape to regulate the flexing action of the secondary flexing segment.

In FIG. 7 is illustrated still another embodiment, wherein the overall flexing action of the sealing ring is somewhat limited by a rigid annular casing 85 which engages the mounting section 62 and has an annular extension 86 which engages a side 87 of the sealing ring body which is disposed generally normally to the axis of the ring. Such casing is of particular aid in installing the seal ring since a hydraulic air pocket is encountered while slipping the ring into place. Such air pocket tends to turn the wiping portion inside-out which now is restrained by the casing. The casing also acts as a guard and is spaced from the primary and secondary flexing segments so as not to directly interfere with their action.

While I have described my invention in connection with certain specific constructions and arrangements, it is to be understood that this is by way of illustration and not by way of limitation and the scope of my invention is defined solely by the appended claims which should be construed as broadly as the prior art will permit.

I claim:

1. A sealing ring or sleeve adapted for effecting a fluid seal between generally concentric surfaces of relatively movable members said sleeve comprising: an annular unitary body of elastic and pliable material generally arcuate in cross-section, said body having an annular stiffening portion located at one terminal thereof and adapted to sealably engage one of said surfaces, said body having at the other terminal thereof an annular portion adapted to sealingly and wipingly engage the other of said surfaces, said body being particularly characterized by an annular web disposed intermediate said wiping portion and said stiffening portion with said web being flanged by relatively thin annular neck portions connecting said respective wiping portion so that a first one of said neck portions will being spaced axially and radially inwardly of said stiffening portion so that a first one of said neck portions will serve as a primary flexing segment whereby the wiping element is made to resiliently seal against said surface of said other element and said other of said neck portions provides a secondary flexing segment whereby the body is permitted to accommodate irregular deformation of the wiping element caused by relative movement between said members while maintaining an annular fluid sealing relationship with said surfaces.

2. A sealing ring adapted for effecting a fluid seal between generally concentric surfaces of relatively movable members, comprising: an annular unitary body having a wiping portion interconnected with a stiffening portion by a plurality of resilient and separated neck portions constituting flexing segments, one of said segments adapted to resiliently maintain said wiping portion in fluid sealing engagement with one of said surfaces of one member and accommodate generally axial movement between said one member and the wiping portion, at least one other of the segments adapted to pliably accommodate the wiping portion to said one member when said one surface moves out of general concentricity with the other surface and while making said one segment maintain said fluid sealing relationship, said other segment extending to one side from said stiffening portion and said one segment being return-bent relative to said other segment.

3. A sealing ring as in claim 2, in which said plurality of segments are each connected by a web of greater thickness so as to localize the flexing of said body to said segments.

4. A sealing ring as in claim 2, in which said body has an annular seat and a resilient means carried on said seat for providing an augmented urging force to retain said wiping element in sealing engagement with said one element.

5. A sealing ring adapted for affecting a fluid seal between generally concentric surfaces of relatively movable members, comprising: an annular unitary body of elastic and pliable material having a wiping portion and a stiffening portion interconnected by a plurality of spaced neck portions constituting flexing segments, one of said segments adapted to resiliently maintain said wiping portion in fluid sealing engagement with one of said surfaces on one member and accommodate generally axial movement between said one member and the wiping portion, the other of said segments having a smaller thickness than said one segment and adapted to pliably accommodate the wiping portion to said one member when said one surface on said one member moves out of general concentricity with the other surface and said one member assumes an irregular shape relative to the sealing ring and while making said wiping portion maintain said fluid sealing relationship, said body having a radially outwardly facing annular seat; and spring means carried on said seat and adapted to provide an augmented urging force to retain said wiping portion in fluid sealing engagement with said one member.

6. A sealing ring as in claim 5, in which said other segments have their axial extent greater in dimension than said one segment.

7. A sealing ring as in claim 5, in which said other segments are located axially to one side of said one segment and are located radially outwardly of said one segment.

8. A sealing ring as in claim 5, in which said spring means comprises a coiled tension spring.

9. A sealing ring as in claim 5, in which said combination comprises a rigid casing mounted about and in engagement with said mounting section and having an annular extension adapted to engage a side of said body disposed normally to the axis of said ring, said casing being spaced from said segments in order to prevent interference in the operation of said ring.

10. In a universal joint having a centering device, a sealing ring for sealing between generally concentric and telescoping members of said centering device, comprising: an annular unitary body of elastic and pliable material having a wiping portion and a stiffening portion interconnected by neck portions constituting primary and secondary flexing segments with the segments joined by a relatively thick web, said wiping portion having an annular lip adapted to be maintained in fluid sealing engagement with one of said centering device members, said stiffening portion having a lateral extent greater than any one of said segments and wiping portion for providing a stiffening base for the ring, said body being movable between two extreme positions, one said position having said body in a substantially unflexed condition and with said wiping portion disposed generally normally to the surface of one element for sealing and having the stiffening portion disposed with its greatest extent generally axially to said surface and having said web biasing between said wiping portion and said stiffening portion at generally 45 degrees to said surface, the other said position having said web generally axially aligned with the stiffening portion and having the wiping portion turned under the web at an acute angle, said primary flexing segment adapted to resiliently maintain said wiping portion in fluid sealing engagement with the surface of said one member and accommodate general axial movement between said one member and the wiping portion, said secondary flexing segment being adapted to pliably accommodate the wiping portion and web to an irregular deformation as it moves from said first position to said second position in response to said one member moving out of concentricity with the other member and in response to the shape of said one member assumed with respect to the wiping portion and while maintaining said wiping portion in fluid sealing engagement with said surfaces.

11. A sealing ring as in claim 10, in which said web is impregnated with an annular rigid material to stiffen the web and thereby to more greatly localize flexing of the body to said primary and secondary flexing segments.

12. A universal joint assembly of the constant angular velocity type, comprising: driving and driven members interconnected by a pair of universal joints with one axis of each joint being held in fixed relative spacial relation; a centering device connected to each of said joints for guiding the angular relationship between said members, said centering device comprising a first support means drivingly connected to said driving member, a male element fixedly mounted on said first support means in axial alignment with said driving member and having an outer surface generated by a first revolved line, second support means drivingly connected to said driven member and having a cavity therein and an annular groove facing radially outwardly, a female socket portion on said second support means and having an insert slidably disposed within said cavity in axial alignment with said driven member, said insert having an inner surface generated by a second line revolved about an axis thereof, said inner surface receiving said outer surface to maintain tangency therewith at least by two radially opposite portions, said first line being comprised of a progression of segmental curves forming a configuration so that said outer surface formed thereby maintains tangency with said inner surface at least at opposite radial portions thereof while accommodating both angular and axial movement of said male element within said female element; and a sealing ring for sealing between said outer surface of said male element and said second support means so as to maintain lubrication within said cavity, said ring having an annular unitary body of elastic and pliable material with an L cross-sectional shape, said body having an annular stiffening portion located at one end of said L adapted to be seated in said annular groove of said second support means, said body having at the other end of the L an annular wiping portion adapted to sealingly engage said outer surface of the male element, said body having an annular web intermediate said wiping portion and said stiffening portion with said web being connected thereto by relatively thin annular neck portions to said respective wiping portion and stiffening portion, said wiping portion being spaced axially and radially inwardly of said stiffening section so that one of said neck portions will serve as a primary flexing segment whereby the wiping portion is made to resiliently seal against the outer surface of said male element and so that the other of said neck portions provides a secondary flexing segment whereby the body is permitted to accommodate irregular deformation of the wiping portion caused by movement of the male element within the female socket portion other than by rotation about its axis and while maintaining an annular fluid sealing relationship with said male element.

13. A universal joint assembly as in claim 12, in which said male element has an outer surface generated by a first line which forms a substantially pointed nose on said male element whereby said driving and driven members of said assembly may traverse large joint angles and still maintain transmission of constant velocity, said sealing ring cooperating with said generally pointed male element to maintain said sealing relationship between said male element and said second support means while said male element may assume a greatly increased irregular shape with respect to the wiping element of said sealing ring at high angles of the members.

References Cited in the file of this patent
UNITED STATES PATENTS

| | | |
|---|---|---|
| 1,987,807 | Swenson | Jan. 15, 1935 |
| 2,316,713 | Procter | Apr. 13, 1943 |
| 2,695,801 | Kosatka | Nov. 30, 1954 |
| 2,760,802 | Haley | Aug. 28, 1956 |